(12) United States Patent
Brensinger et al.

(10) Patent No.: US 10,524,563 B2
(45) Date of Patent: Jan. 7, 2020

(54) TABLE TOP AND FRAME

(71) Applicant: NEMO EQUIPMENT, INC., Dover, NH (US)

(72) Inventors: Camon Brensinger, Stratham, NH (US); Patrick McCluskey, Lee, NH (US); Kurtis Schnackenberg, Dover, NH (US); Zackary Kamen, Newburyport, MA (US)

(73) Assignee: NEMO Equipement, Inc., Dover, NH (US)

( * ) Notice: Subject to any disclaimer, the term of this patent is extended or adjusted under 35 U.S.C. 154(b) by 0 days.

(21) Appl. No.: 15/878,989

(22) Filed: Jan. 24, 2018

(65) Prior Publication Data

US 2019/0098993 A1  Apr. 4, 2019

Related U.S. Application Data

(60) Provisional application No. 62/449,818, filed on Jan. 24, 2017.

(51) Int. Cl.
*A47B 3/12* (2006.01)
*A47B 3/083* (2006.01)
(Continued)

(52) U.S. Cl.
CPC ............. *A47B 3/12* (2013.01); *A47B 3/002* (2013.01); *A47B 3/06* (2013.01); *A47B 3/083* (2013.01); *A47B 3/0803* (2013.01); *A47B 13/003* (2013.01); *A47B 13/088* (2013.01); *A47B 37/04* (2013.01); *F16B 12/44* (2013.01); *A47B 2003/0806* (2013.01);
(Continued)

(58) Field of Classification Search
CPC .... A47B 2003/0835; A47B 2220/0083; A47B 13/003; A47B 3/083; A47B 3/06; A47B 3/0803; A47B 3/12; A47B 37/04; A47B 2003/0806; A47B 3/002; A47B 2200/001; A47B 2200/0072; A47C 5/005; A47C 7/70; F16B 12/44; F16B 2012/446
USPC .............................. 108/115, 90, 66, 166, 156
See application file for complete search history.

(56) References Cited

U.S. PATENT DOCUMENTS 900,552 A * 10/1908 Kade
2,634,183 A *  4/1953 Derman ................... A47B 1/00
108/157.1
(Continued)

FOREIGN PATENT DOCUMENTS

DE        4237290    *  5/1994
DE       19926020    * 12/2000
(Continued)

*Primary Examiner* — Janet M Wilkens

(57) ABSTRACT

A two-piece table includes a one-piece tabletop portion and a one piece table leg portion. The tabletop portion is made of four or more distinct independent, hinged segments which allow the tabletop fold, origami style, into a small package. The tabletop further includes four corners having various chamfered ends or corners which allows for the creation of a handle in the longer ends or corners of the tabletop. The table leg portion is a foldable, unitary structure including four legs and a top portion on which the table top rests without any attachment. The top portion of the table leg portion fits into a slot or groove on the underside of the tabletop. The table leg portion is hinged and folds into a square.

1 Claim, 11 Drawing Sheets

(51) Int. Cl.
*A47B 13/08* (2006.01)
*A47B 3/08* (2006.01)
*A47B 3/06* (2006.01)
*F16B 12/44* (2006.01)
*A47B 37/04* (2006.01)
*A47B 13/00* (2006.01)
*A47B 3/00* (2006.01)

(52) U.S. Cl.
CPC . *A47B 2200/001* (2013.01); *A47B 2220/0072* (2013.01); *F16B 2012/446* (2013.01)

(56) References Cited

U.S. PATENT DOCUMENTS

| | | | | | |
|---|---|---|---|---|---|
| 2,654,647 | A * | 10/1953 | Murray | A47B 3/083 108/173 |
| 3,055,573 | A * | 9/1962 | Carter | B65D 5/002 229/117.16 |
| 3,188,158 | A * | 6/1965 | Sanchez | A47B 3/002 108/124 |
| 3,490,394 | A * | 1/1970 | Crandall | A47B 3/00 108/115 |
| 3,520,259 | A * | 7/1970 | Oscoz Sanchez | A47B 3/002 108/79 |
| 3,592,143 | A * | 7/1971 | Krone | A47B 3/00 108/115 |
| 3,751,317 | A * | 8/1973 | Galloway | A47B 7/00 108/161 |
| 4,223,945 | A * | 9/1980 | Nikitits | A47B 3/14 108/166 |
| 4,860,667 | A * | 8/1989 | Cardenas | A47B 3/00 108/115 |
| 5,088,419 | A * | 2/1992 | Hartwell | A47B 3/083 108/166 |
| 5,363,613 | A * | 11/1994 | Sevier | A47B 47/025 108/115 |
| 5,562,050 | A * | 10/1996 | Colquhoun | A47B 3/002 108/115 |
| 6,161,901 | A * | 12/2000 | Avner | A47C 5/005 108/165 |
| 6,314,892 | B1* | 11/2001 | Favini | A47B 3/002 108/115 |
| 8,276,525 | B2* | 10/2012 | Janssen | A47B 21/02 108/115 |
| 2003/0205180 | A1* | 11/2003 | Bishop | A47B 3/06 108/158.12 |
| 2006/0021550 | A1* | 2/2006 | Sagol | A47B 3/02 108/115 |
| 2007/0256610 | A1* | 11/2007 | Robinson | A47B 3/083 108/115 |
| 2009/0301361 | A1* | 12/2009 | Hsieh | A47B 3/002 108/129 |
| 2018/0213926 | A1* | 8/2018 | Brensinger | A47B 3/083 |

FOREIGN PATENT DOCUMENTS

| | | | |
|---|---|---|---|
| EP | 0073640 | * | 3/1983 |
| EP | 257370 | * | 2/1988 |
| FR | 2924582 | * | 6/2009 |
| FR | 3000651 | * | 7/2014 |
| GB | 941862 | * | 11/1963 |
| JP | HO641555 | * | 6/1994 |

* cited by examiner

TABLE TOP AND FRAME

CROSS-REFERENCE TO RELATED APPLICATIONS

This application claims priority from U.S. Provisional Patent Application No. 62/449,818 filed on Jan. 24, 2017 and titled "OUTDOOR EQUIPMENT 2016", which is incorporated fully herein by reference.

TECHNICAL FIELD

The present invention relates to outdoor equipment, outdoor furniture, outdoor camping equipment and parts and fittings therefore, and more particularly, relates to a collapsible/foldable table including a unique foldable tabletop and foldable legs

BACKGROUND INFORMATION

A large portion of the population enjoy camping and other outdoor activities. When engaged in these activities, however, many people enjoy some of the comforts of home. This includes a table or other surface which can be used to prepare food, serve food or place various objects including Cook stoves and the like for use during outdoor activities.

Although individuals engaged in the activities enjoy such comforts of home, weight, space and collapsibility is still an important feature. If the table is not able to be folded and stored in a small area and if it is too heavy, its usefulness will be lost to campers and outdoor enthusiasts. Accordingly, what is needed is a highly collapsible/foldable lightweight table which can be folded for purposes of packing it to the outdoor area but which can be folded to form a multipurpose, useful table.

SUMMARY

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 1:
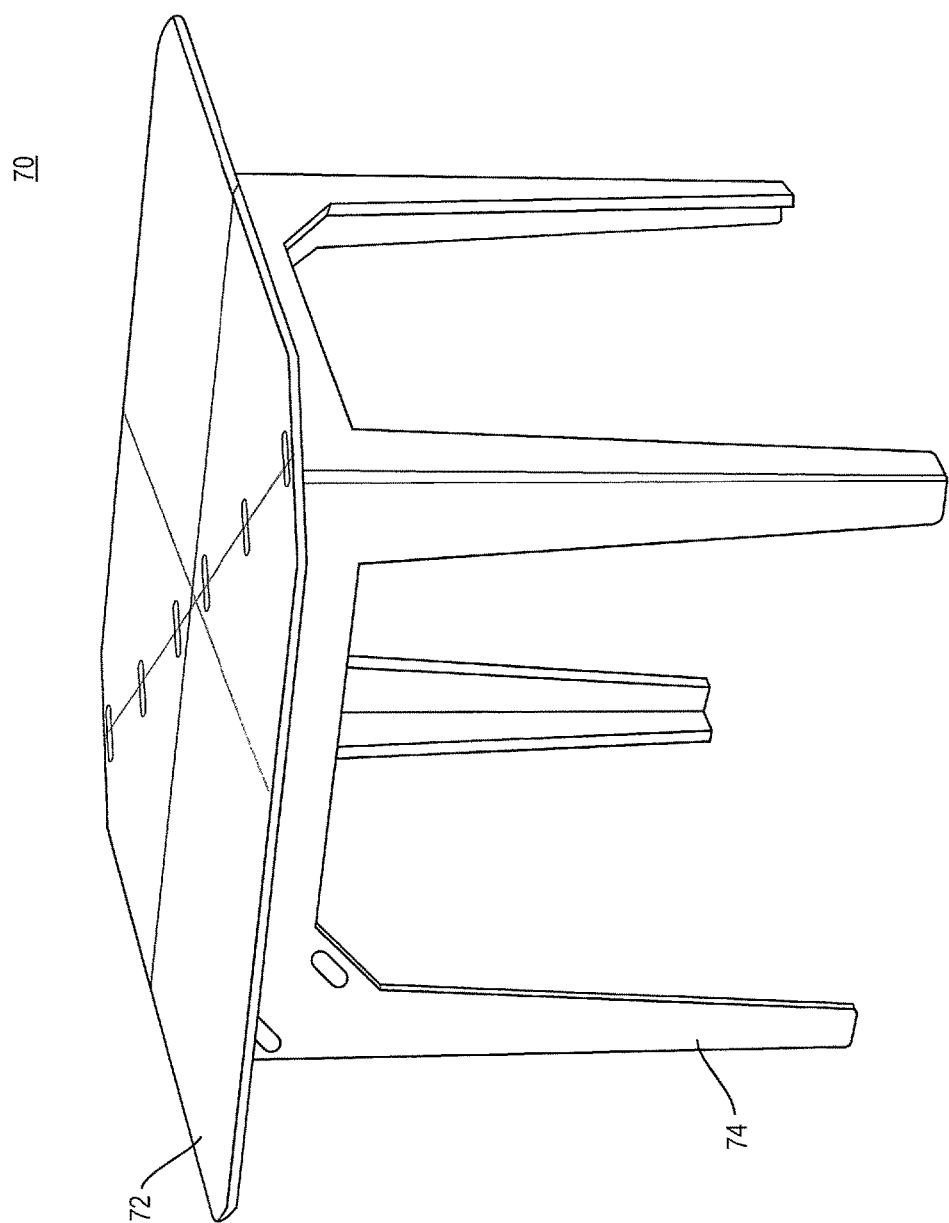
FIG. 1 is a perspective view of the foldable tabletop and table frame assembly according to the present invention.
Figure 2:
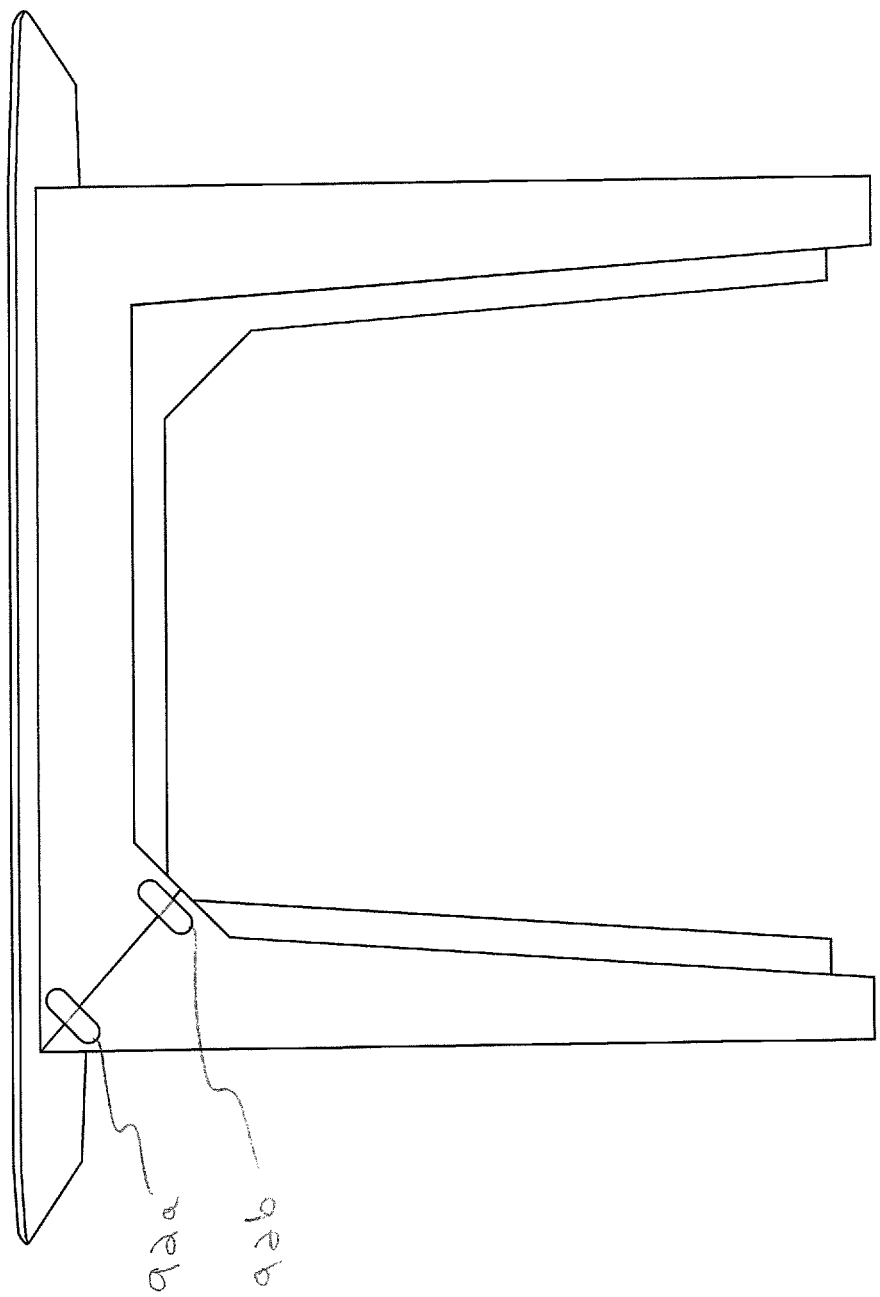
FIG. 2 is a side elevation of view of the foldable tabletop and table frame assembly according to the present invention.
Figure 3:
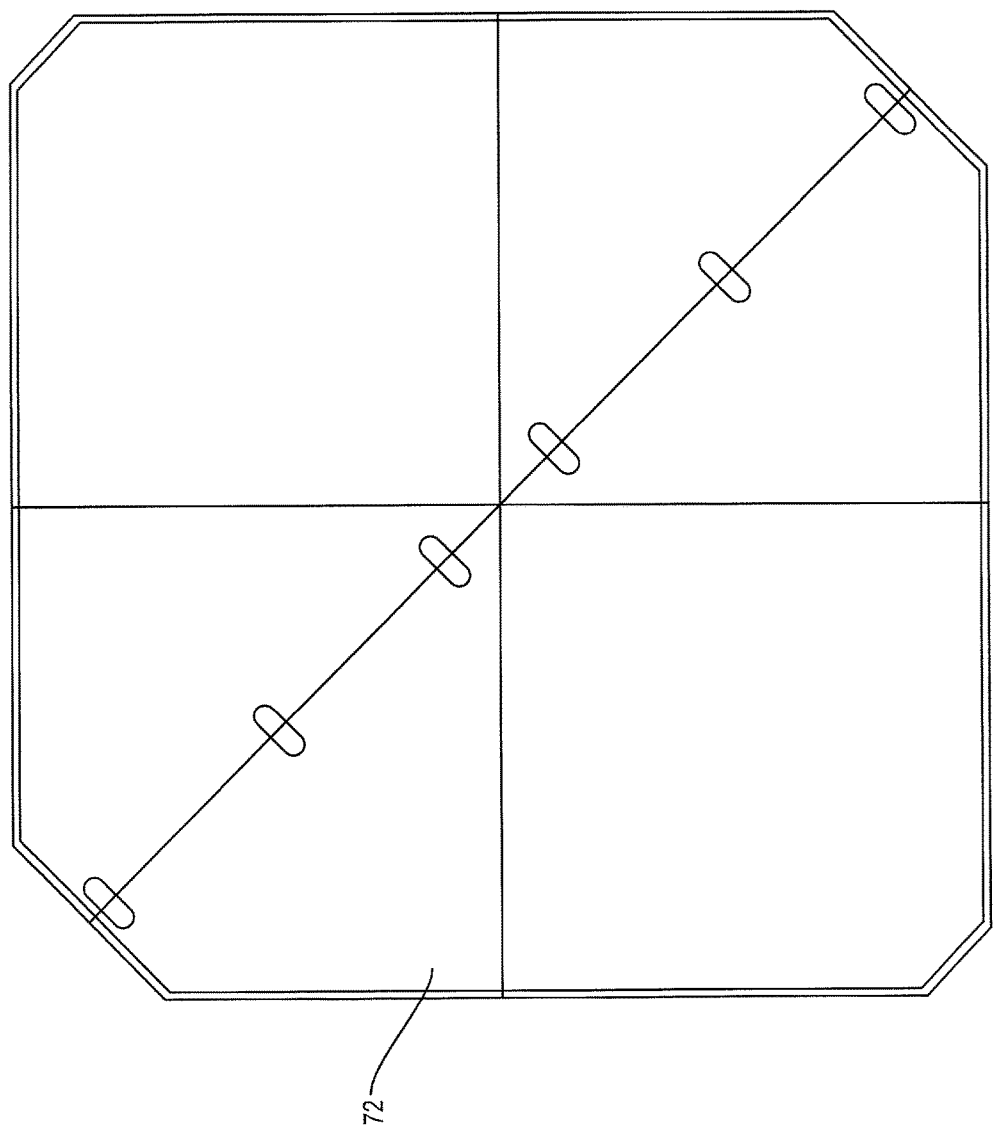
FIG. 3 is a top view of the foldable tabletop which forms a part of the foldable tabletop and table frame assembly of the present invention.
Figure 4:
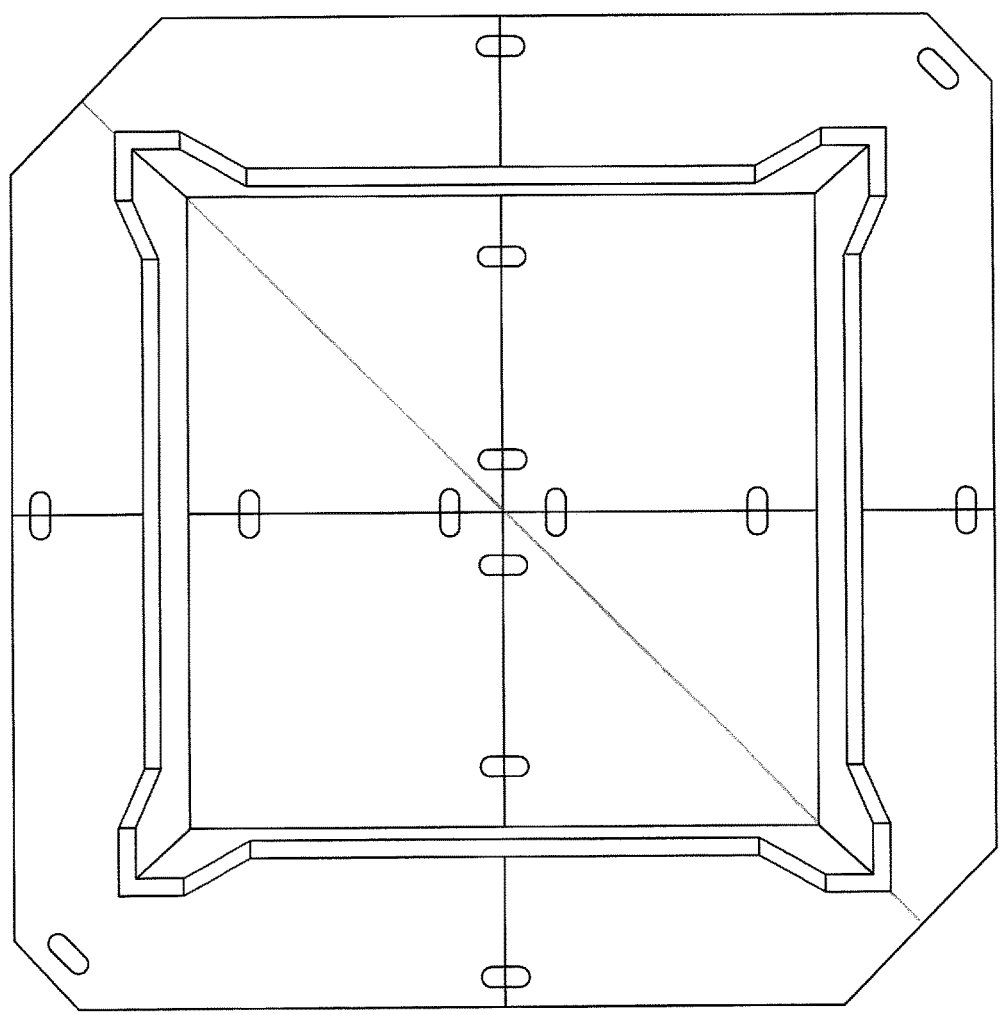
FIG. 4 is a bottom view of the foldable tabletop with foldable legs in place as part of the foldable tabletop and table frame assembly according to the present invention.
Figure 6:
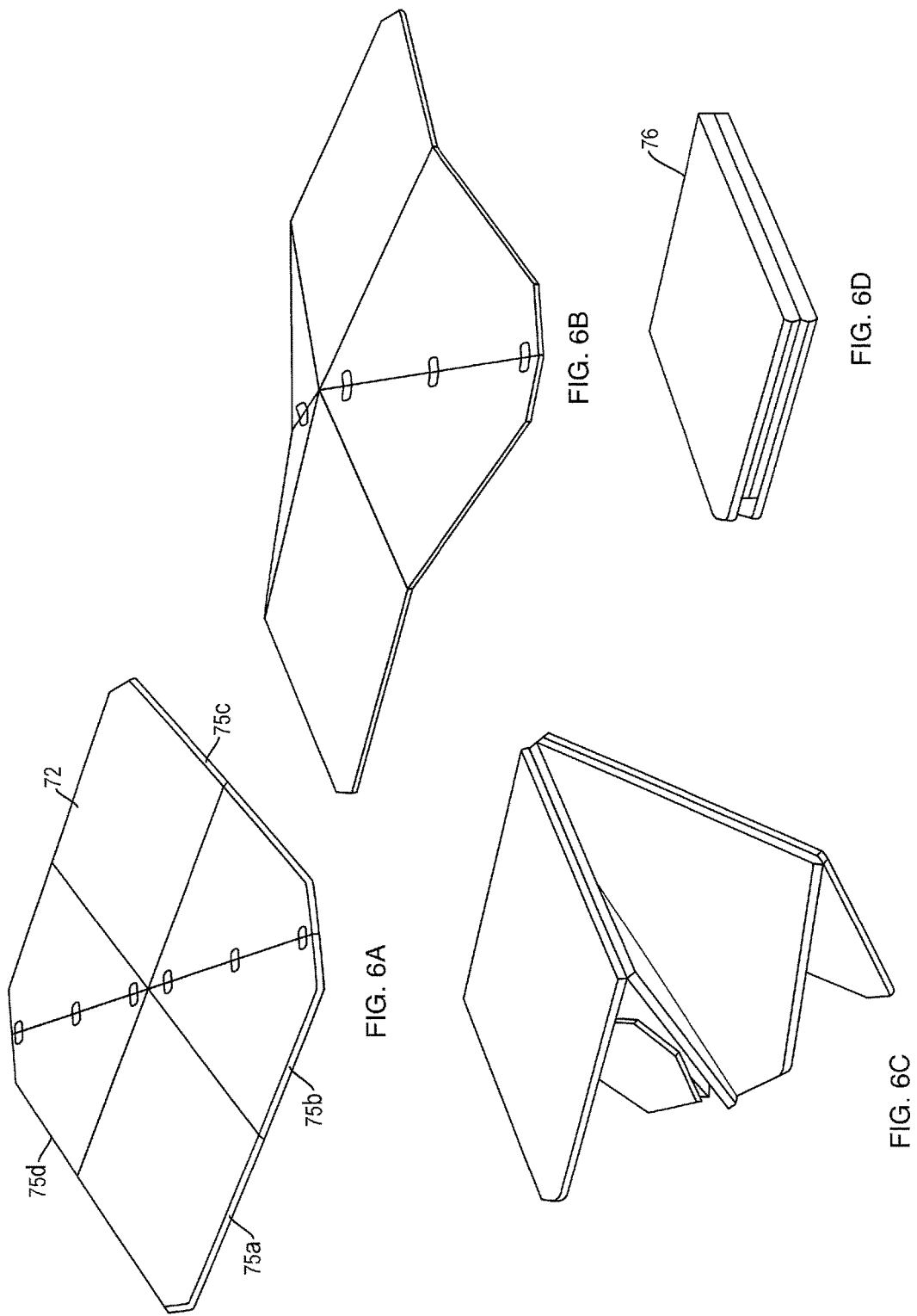
FIGS. 6A through 6D illustrate the foldable tabletop in various stages of being folded into a compact one-piece unit.
Figure 7:
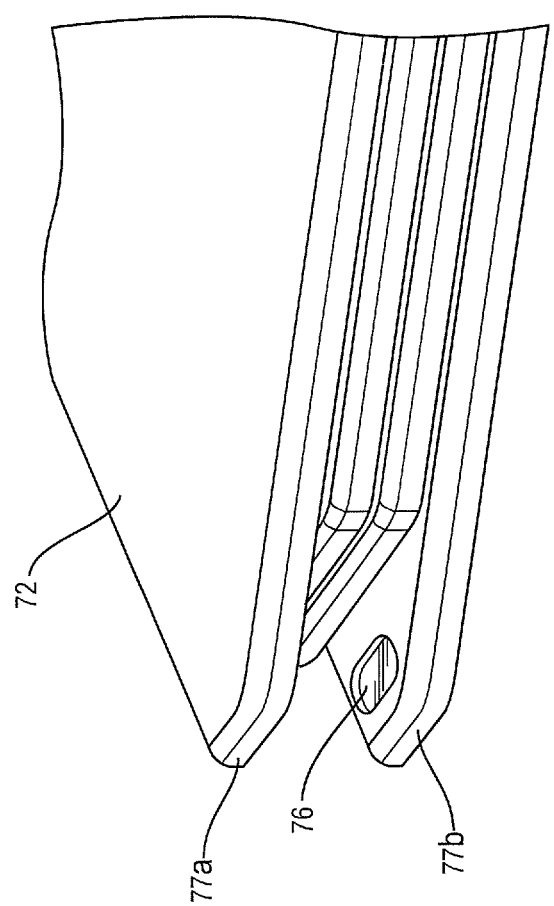
FIG. 7 illustrates the chamfered corner regions of the tabletop according to one feature of the foldable tabletop and table frame assembly according to the present invention.

A feature of the present invention includes a two-piece table 70, FIG. 1 including a one-piece tabletop portion 72 and a one piece table leg portion 74. The tabletop portion 72, FIG. 6A, is made of four or more distinct independent, hinged segments 75a-75d which allow the tabletop 72 to fold, origami style, into a small package 76 FIG. 6D. The tabletop 72, FIG. 7, includes four corners 77a-77b having various chamfered ends or corners which allows for the creation of a handle 76 in the longer ends or corners 77a and 77b of the tabletop 72.

Figure 5:
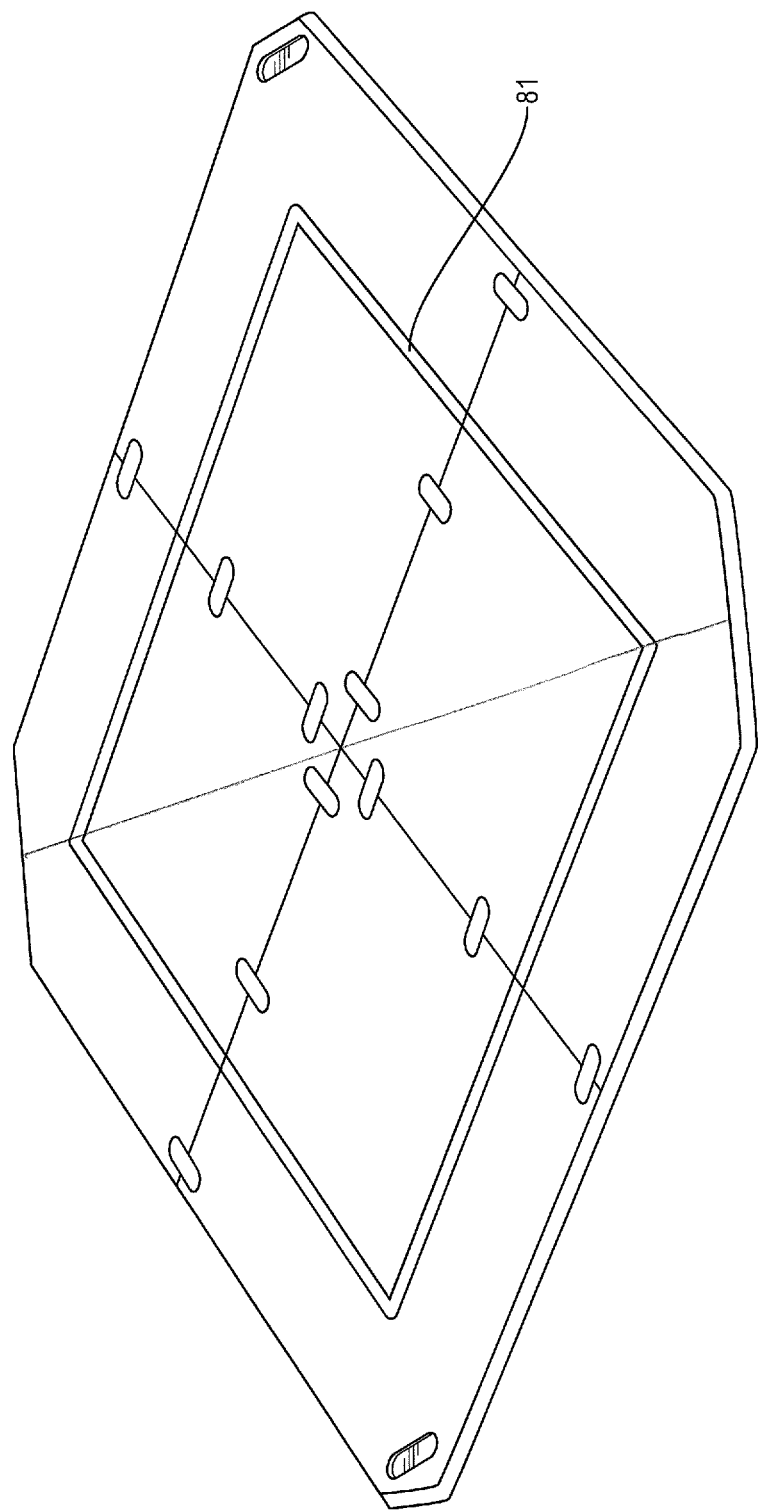
FIG. 5 is a bottom view of the foldable tabletop according to the present invention.
Figure 8:
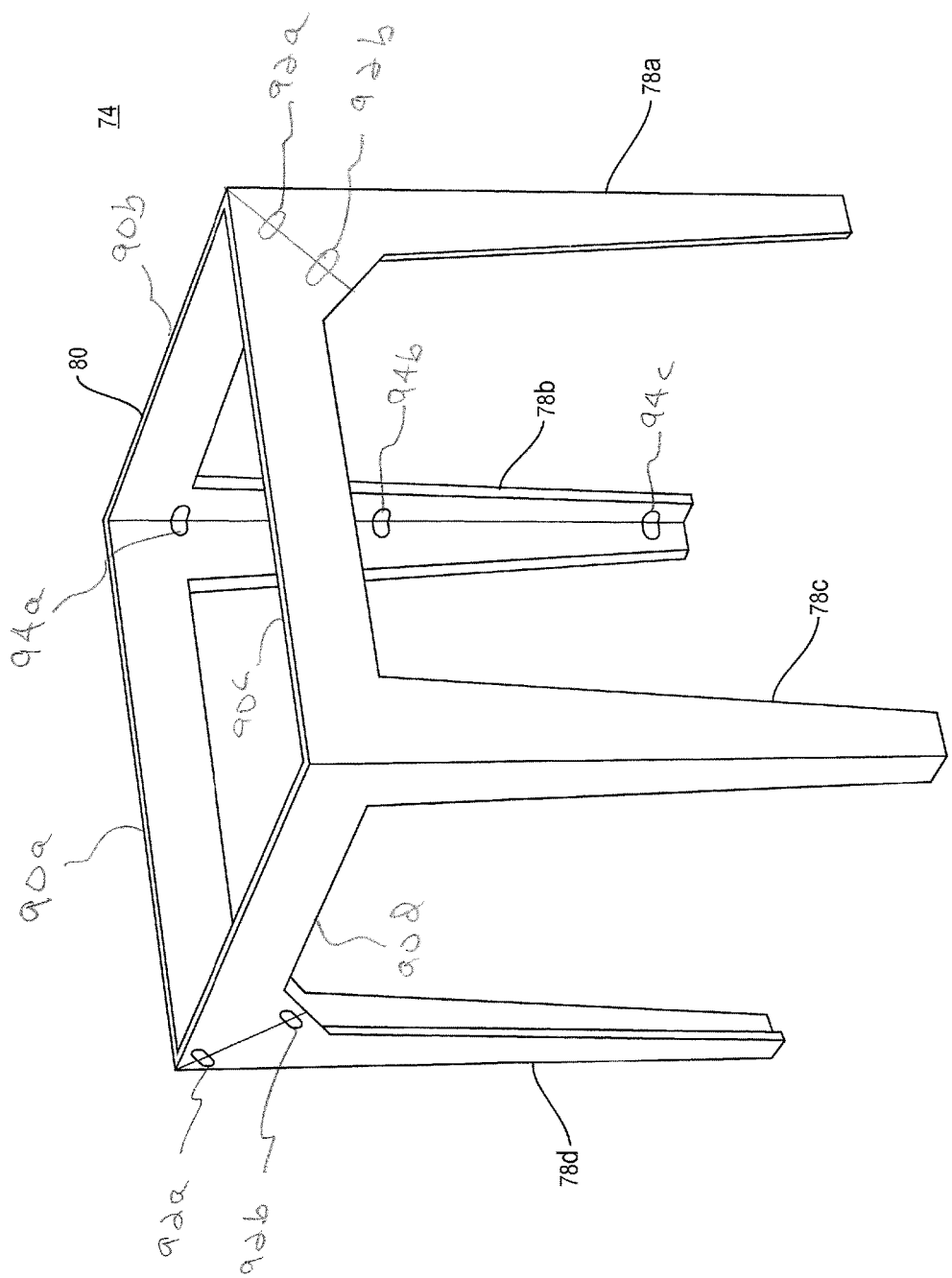
FIG. 8 is a perspective view of the foldable legs according to another feature of the foldable tabletop and table frame assembly according to the present invention.
Figure 9B:
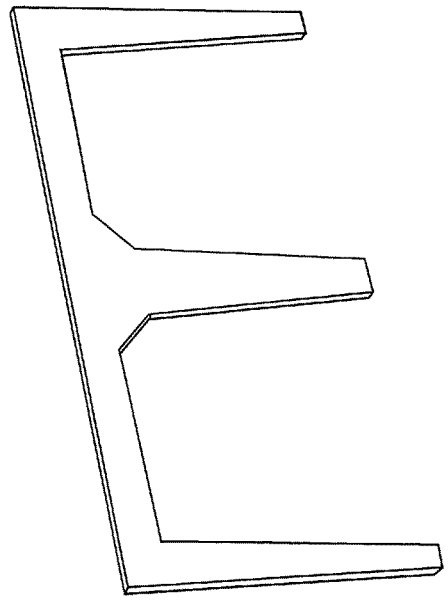
FIGS. 9A through 9D illustrate how the foldable legs according to one feature of the present invention folded into a small, compact square size.
Figure 9D:
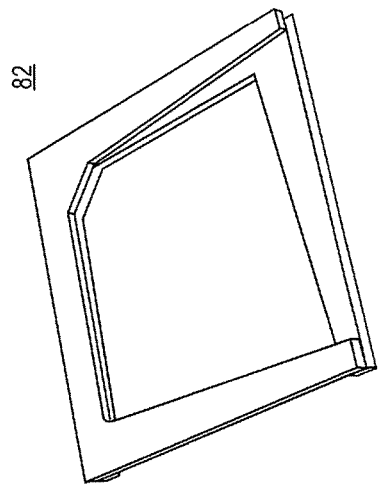
Figure 9A:
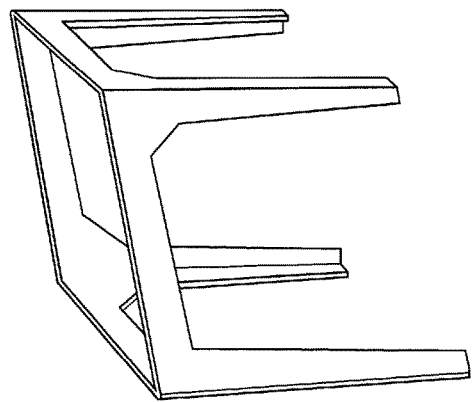
Figure 9C:
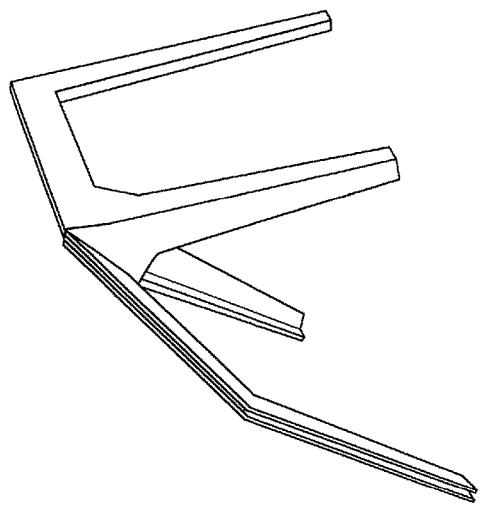
Figure 10:
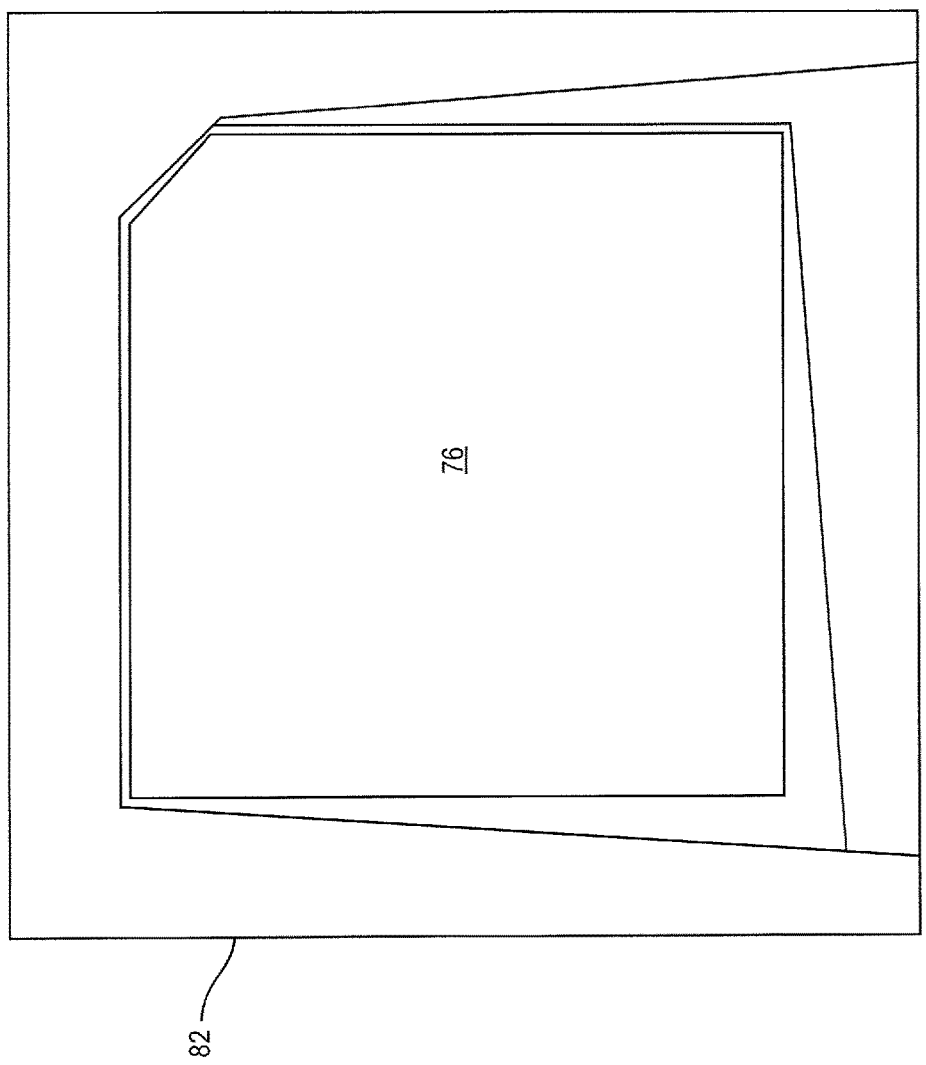
FIG. 10 is a close-up perspective view of the folded table legs in accordance with one feature of the present invention.
Figure 11:
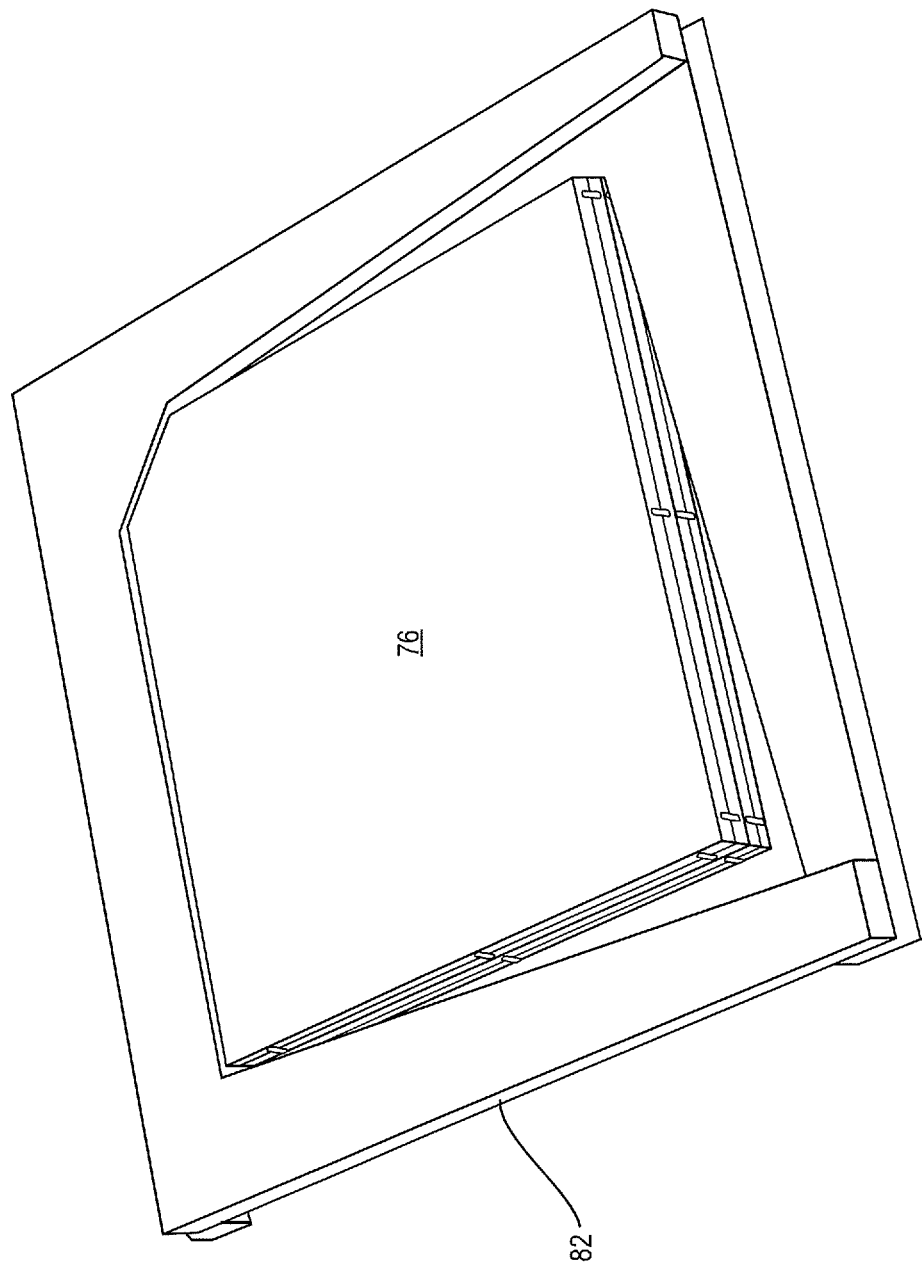
FIG. 11 is a top view of the foldable tabletop nested inside the foldable legs according to one feature of the foldable tabletop and table frame assembly according to the present invention.

The table leg portion 74 is a foldable, unitary structure including four legs 78a-78d, FIG. 8, four tabletop leg connector elements 90a-90d, and a top portion 80 on which the table top portion 72 rests without any attachment, in one embodiment. The top portion 80 of the table leg portion 74 fits into a slot or groove 81, FIG. 5, on the underside of the tabletop 72. The table leg portion 74 is hinged 92a, 92b proximate each table leg corner while each leg 78a-78d is hinged along its length by one or more hinges 94a-94c. The hinges 92a-92b and 94a-95c in the table leg portion 74 and table legs 78a-78d respectively allow the table leg portion 74 to fold into a square 82, FIGS. 9A-9B. In this manner, for storage and packability purposes, the folded tabletop 76, FIGS. 10 and 11, can be nested or stored in the central opening of the folded leg frame 82.

The tabletop 72 may be made of a wood material, such as bamboo, as well as other suitable materials including but not limited to plastic, composite materials, metal and heavy-duty corrugated cardboard. Similarly, the table leg portion 74 may be constructed of plastic, lightweight wood, reinforced cardboard, composite materials or the like.

Modifications and substitutions by one of ordinary skill in the art are considered to be within the scope of the present invention, which is not to be limited except by the following claims.

The invention claimed is:

1. A foldable tabletop and tabletop supporting leg structure comprising:
    a tabletop comprising a plurality of segments, each of said plurality of segments coupled to an adjacent two of said plurality of segments by a hinge mechanism, said hinge mechanism configured for allowing one or more of said plurality of segments to fold along said hinge mechanism onto an adjacent one of said plurality of segments, said tabletop including a top surface and a bottom surface and a periphery, said bottom surface of said tabletop including a groove extending from said bottom surface of said tabletop toward but not through said top surface of said tabletop, said groove disposed parallel to and proximate the periphery of said tabletop; and
    a tabletop leg structure, said tabletop leg structure including four table legs, each of said four table legs coupled to two adjacent table legs by means of first and second tabletop leg connector elements from among four tabletop leg connector elements, said four tabletop leg connector elements disposed proximate a top surface of said table leg structure and configured for being disposed in said groove in said bottom surface of said tabletop, each of said four table legs comprised of a first table leg piece hinged to a second table leg piece and configured for allowing said first and second table leg piece is to fold flat onto one another, each of said four tabletop leg connector elements including a hinge element disposed between one of said four tabletop leg connector elements and two adjacent tabletop leg connector elements, for allowing said tabletop leg structure to fold into a generally square, generally flat structure.

* * * * *